Patented Mar. 18, 1947

2,417,777

UNITED STATES PATENT OFFICE 2,417,777

ANTIGENS AND METHOD OF PREPARING THEM

Clara Nigg, Princeton, N. J., assignor to E. R. Squibb & Sons, New York, N. Y., a corporation of New York No Drawing. Application July 10, 1943, Serial No. 494,263

14 Claims. (Cl. 167—78)

This invention relates to complement-fixing virus antigens, especially lymphogranuloma-venereum antigens.

Highly-active lymphogranuloma-venereum antigens suitable for use in the diagnosis (by both cutaneous and complement-fixation tests), prophylaxis, and therapy of lymphogranuloma venereum, have recently been obtained by propagating the virus in the yolk-sacs of developing fowl-embryos, and preparing a non-infectious suspension of the virus-containing embryo material (i. e., the yolk and/or the yolk-sac) in a suitable aqueous medium; and improved lymphogranuloma-venereum antigens have also been obtained by inoculating mammal lung with a high-titer lymphogranuloma-venereum virus, propagating the virus therein, preparing a suspension of the lung material in a suitable aqueous medium, removing inactive material therefrom by differential centrifugation, and rendering the suspension non-infectious. These antigens are described and claimed in the following copending applications: Serial No. 382,168, filed March 7, 1941, now Patent No. 2,355,676, dated August, 15, 1944; Serial No. 382,169, filed March 7, 1941; and Serial No. 382,334, filed March 8, 1941, now Pat. No. 2,324,646, dated July 20, 1943.

These antigens were rendered non-infectious (or inactivated) by heat-sterilization or treatment with formalin. More recently, improved non-infectious lymphogranuloma-venereum antigens have been obtained by treating the infectious antigen with a protein-denaturing agent of the aliphatic carbamyl-compound type, especially urea; these antigens being described and claimed in application Serial No. 429,102, filed January 31, 1942.

It is the object of this invention to provide improved complement-fixing virus antigens, especially further improved lymphogranuloma-venereum antigens, and a method of preparing such antigens.

In accordance with this invention, complement-fixing virus antigens are improved by treatment with a phenol-type compound (i. e., phenol and nuclear-substituted phenols), especially phenol. Thus, treatment of a 10% saline suspension of a yolk-sac culture of the agent of lymphogranuloma venereum with 0.5% phenol, in addition to rendering the suspension non-infectious and effectively preserving it against bacterial contamination (without the deleterious effect obtained with formalin), enhances the complement-fixing activity thereof many times (of the order of 4-8 times); and the resulting antigen is devoid of objectionable turbidity, and so thermostable that it may be safely shipped without refrigeration and used in warm climates.

In general, the preferred lymphogranuloma-venereum antigen of this invention is obtained by propagating the agent of lymphogranuloma venereum in the yolk-sacs of developing fowl-embryos, preparing an aqueous suspension of the virus-containing embryo material, and subjecting the suspension to the action of a phenol-type compound in low concentration (say, a concentration of the order of 0.1–5%). The action of the phenol-type compound is a function of its concentration and the temperature; thus, treatment with 0.5% phenol at icebox temperature and with 0.25% phenol at 56° C. have substantially the same enhancing effect on the complement-fixing activity. The action of the phenol-type compound is also affected by the pH of the reaction medium, enhancement of the complement-fixing activity being favored by a pH of about 6–8.

The following examples are illustrative of the invention:

Example 1

6–7 day chicken eggs are each inoculated in the yolk-sac (in the known manner) with 0.2–1 cc. of a 1:100–1:1,000,000 dilution of bacteriologically-sterile yolk-sac harvested from eggs infected by this route with lymphogranuloma-venereum virus.

After 5–10 days (i. e., as soon as the embryos are moribund or dead), the eggs are opened and the yolk-sacs removed, weighed, made up to a 10–20% suspension with broth or physiological saline solution, and the suspension is homogenized in a mechanical blender. Sufficient phenol (either solid or in solution, e. g., 5% aqueous solution) is added to give a final concentration of 0.5% phenol; and the phenol-treated suspension is kept at icebox temperature for several days before testing for viable virus therein (e. g., by inoculation of chick embryos). If the virus has been completely inactivated, the antigen is ready for use, after appropriate dilution (depending on the potency of the antigen). Thus, the antigen may be diluted 1:100–1:6,400 and then used in the complement-fixation test for the detection of lymphogranuloma-venereum infection described and claimed in copending application Serial No. 382,169, filed March 7, 1941. Exceptional results are obtained with this antigen in the complement-fixation test, the enhancement of activity being quite specific—since phenolized control antigens (i. e., suspensions of normal yolk-sac treated in an identical manner) do not give fixation with the same positive and negative sera.

The antigen may also be used for the diagnosis by cutaneous test, prophylaxis, and therapy of lymphogranuloma venereum.

*Example 2*

The procedure of Example 1 is followed, except that sufficient phenol is added to give a final concentration of 0.25% phenol, and the phenol-treated suspension is maintained at 56° C. for 15 hours. The activity of the resulting antigen is thus enhanced many times.

*Example 3*

The procedure of Example 1 is followed, except that sufficient phenol is added to give a final concentration of 0.25% phenol, the phenol-treated suspension is maintained at 56° C. for 15 hours, and centrifuged at 2000 R. P. M. for 10 minutes. The slightly opalescent supernatant (after removal of tissue debris and coagulated protein) is almost as active as the antigen obtained in Example 2, despite the considerable purification effected.

*Example 4*

The procedure of Example 1 is followed, except that sufficient phenol is added to give a final concentration of 0.25% phenol, and the phenol-treated suspension is boiled for 10 minutes. The activity of this antigen is substantially the same as that obtained in Example 2.

This antigen also may be advantageously purified by centrifuging, as described in Example 3.

*Example 5*

The procedure of Example 1 is followed, except that the pH of the phenolized suspension is adjusted (by addition of a suitable buffer, such as disodium hydrogen phosphate) to 6.4; alternatively, the pH of the suspension may be correspondingly adjusted before the phenol has been added. The activity of the resulting antigen is enhanced many times.

*Example 6*

The procedure of Example 5 is followed, except that the pH of the phenolized suspension is adjusted to 7.5. Here, again, the activity of the resulting antigen is enhanced many times.

*Example 7*

The procedure of Example 1 is followed, except that the pH of the phenolized suspension is adjusted to 7.5, and the suspension is boiled for 10 minutes. Both the whole suspension and the supernatant obtained by centrifuging at 2000 R. P. M. for 10 minutes are antigens of enhanced activity.

*Example 8*

The procedure of Example 1 is followed, except that sufficient picric acid is added (instead of phenol) to give a final concentration of 0.25–0.5% picric acid. The activity of the resulting antigen is thus enhanced many times.

Similarly, a lymphogranuloma-venereum antigen prepared from other infected animal tissues, e. g., a mouse-lung antigen, may be phenolized as described in the foregoing examples to obtain a non-infectious antigen of enhanced activity. Also, in place of the phenol or picric acid in the foregoing examples, other phenol-type compounds may be employed, inter alia, cresol, and thymol.

The invention is effective for the improvement of complement-fixing virus antigens generally, especially antigens of viruses of the lymphogranuloma-venereum-psittacosis group. Thus, the complement-fixing activity of the psittacosis antigen (e. g., the suspension of heavily infected mouse spleen described by Bedson in Lancet, 1937, II, 233, page 1477) is materially enhanced by treating it with a phenol-type compound in the manner detailed in the foregoing examples. The activity of the antigen prepared from the virus of meningopneumonitis may be similarly enhanced.

The invention may be variously otherwise embodied within the scope of the appended claims.

I claim:

1. A non-infectious, complement-fixing antigen of a virus of the psittacosis-lymphogranuloma-venereum group, obtained by subjecting an infectious antigen of the virus to the action of a phenol-type compound and increasing the reactivity of the latter beyond that required to render the antigen non-infectious.

2. A non-infectious, complement-fixing lymphogranuloma-venereum antigen, obtained by subjecting an infectious lymphogranuloma-venereum antigen to the action of a phenol-type compound and increasing the reactivity of the latter beyond that required to render the antigen non-infectious.

3. A non-infectious, complement-fixing lymphogranuloma-venereum antigen, obtained by subjecting an infectious lymphogranuloma-venereum antigen to the action of phenol and increasing the reactivity of the phenol beyond that required to render the antigen non-infectious.

4. A non-infectious, complement-fixing lymphogranuloma-venereum antigen, obtained by propagating the agent of lymphogranuloma venereum in the yolk-sacs of developing fowl-embryos, preparing an aqueous suspension of the virus-containing embryo material, subjecting the suspension to the action of a phenol-type compound, and increasing the reactivity of the latter beyond that required to render the antigen non-infectious.

5. A non-infectious, complement-fixing lymphogranuloma-venereum antigen, obtained by propagating the agent of lymphogranuloma venereum in the yolk-sacs of developing fowl-embryos, preparing an aqueous suspension of the virus-containing embryo material, adding a phenol-type compound, heating until the complement-fixing activity is substantially enhanced, and centrifuging the suspension to remove tissue debris and coagulated protein.

6. The method of preparing a non-infectious, complement-fixing antigen of a virus of the psittacosis - lymphogranuloma - venereum group, which comprises subjecting an infectious antigen of the virus to the action of a phenol-type compound and increasing the reactivity of the latter beyond that required to render the antigen non-infectious.

7. The method of preparing a non-infectious, complement-fixing lymphogranuloma - venereum antigen, which comprises subjecting an infectious lymphogranuloma-venereum antigen to the action of a phenol-type compound and increasing the reactivity of the latter beyond that required to render the antigen non-infectious.

8. The method of preparing a non-infectious, complement-fixing antigen of a virus of the psittacosis - lymphogranuloma - venereum group, which comprises subjecting an infectious antigen of the virus to the action of phenol and increasing the reactivity of the phenol beyond that required to render the antigen non-infectious.

9. The method of preparing a non-infectious, complement-fixing lymphogranuloma-venereum antigen, which comprises subjecting an infectious lymphogranuloma-venereum antigen to the action of phenol in a concentration greater than that required to render the antigen non-infectious.

10. The method of preparing a non-infectious, complement-fixing lymphogranuloma-venereum antigen, which comprises subjecting an infectious lymphogranuloma-venereum antigen to the action of phenol in a concentration of about 0.5%.

11. The method of preparing a non-infectious, complement-fixing lymphogranuloma-venereum antigen, which comprises treating an infectious lymphogranuloma-venereum antigen with phenol, and heating the phenolized antigen until its complement-fixing activity is substantially enhanced.

12. The method of preparing a non-infectious, complement-fixing lymphogranuloma-venereum antigen, which comprises propagating the agent of lymphogranuloma-venereum in the yolk-sacs of developing fowl-embryos, preparing an aqueous suspension of the virus-containing embryo material, subjecting the suspension to the action of a phenol-type compound, and increasing the reactivity of the latter beyond that required to render the antigen non-infectious.

13. The method of preparing a non-infectious, complement-fixing lymphogranuloma-venereum antigen, which comprises treating an infectious lymphogranuloma-venereum antigen with phenol, and boiling the phenolized antigen until its complement-fixing activity is substantially enhanced.

14. The method of preparing a non-infectious, complement-fixing lymphogranuloma-venereum antigen, which comprises subjecting an infectious lymphogranuloma-venereum antigen to the action of phenol at a pH of about 6–8, and increasing the reactivity of the phenol beyond that required to render the antigen non-infectious.

CLARA NIGG.

REFERENCES CITED

The following references are of record in the file of this patent:

UNITED STATES PATENTS

| Number | Name | Date |
| --- | --- | --- |
| 2,324,646 | Rake et al. | July 20, 1943 |
| 2,202,435 | Shoetensack | May 28, 1940 |

OTHER REFERENCES

Biological Products—Gershenfeld (1939) pages 214 and 215. (Copy in Div. 43.)